United States Patent
Sharma

(10) Patent No.: US 6,918,070 B1
(45) Date of Patent: Jul. 12, 2005

(54) NETWORK PERFORMANCE MONITORING AND RESTORATION BASED ON TRANSMISSION CODE VIOLATIONS

(75) Inventor: Rohit Sharma, Sunnyvale, CA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/580,029

(22) Filed: May 26, 2000

Related U.S. Application Data
(60) Provisional application No. 60/136,624, filed on May 27, 1999.

(51) Int. Cl.[7] ............................................. G06F 11/00
(52) U.S. Cl. ........................................ 714/708; 714/707
(58) Field of Search ................................. 714/708, 707, 714/704, 811, 752; 370/424, 221, 254, 516, 217, 16; 341/59

(56) References Cited

U.S. PATENT DOCUMENTS

| | | | | |
|---|---|---|---|---|
| 5,285,459 A | * | 2/1994 | Okuyama et al. | ............ 714/811 |
| 5,293,378 A | * | 3/1994 | Shimizu | ...................... 370/474 |
| 5,495,471 A | * | 2/1996 | Chow et al. | ................... 370/16 |
| 5,740,186 A | | 4/1998 | Widmer | ....................... 714/753 |
| 5,784,387 A | * | 7/1998 | Widmer | ....................... 714/752 |
| 6,058,103 A | * | 5/2000 | Henderson et al. | ......... 370/254 |
| 6,198,413 B1 | * | 3/2001 | Widmer | ....................... 341/59 |
| 6,285,688 B1 | * | 9/2001 | Henderson et al. | ......... 370/516 |
| 6,556,539 B1 | * | 4/2003 | Henderson | .................. 370/217 |

OTHER PUBLICATIONS

Widmer et al., "A DC–Balanced, Partitioned–Block, 8B/10B Transmission Code," *IBM Journal of Research and Development*, vol. 27, No. 5 (Sep. 1983), pp. 440–451.

* cited by examiner

*Primary Examiner*—David Ton
(74) *Attorney, Agent, or Firm*—Michael R. Cammarata; Shailendra Bhumralkar; Kirk A. Gottlieb

(57) ABSTRACT

A network element (NE) in a communications network decodes a data stream received over a communication link. Upon synchronization with the data stream, the NE determines a performance metric for the link based on a number of transmission code violations. In response to the performance metric exceeding a predetermined threshold, the NE commands the selection of a different link to carry the data stream via a switch signal. The switching or rerouting of signals may occur between a single pair of NEs (e.g., point-to-point span) or in a more complex topology having a plurality of interconnected NEs.

21 Claims, 4 Drawing Sheets

NETWORK PERFORMANCE MONITORING AND RESTORATION BASED ON TRANSMISSION CODE VIOLATIONS

CLAIM OF BENEFIT FROM PROVISIONAL APPLICATION

This application hereby claims the benefit under 35 U.S.C. § 119(e) of provisional patent application Ser. No. 60/136,624, entitled "Network Performance Monitoring and Restoration Based on Transmission Code Violations", filed on May 27, 1999, which provisional application is incorporated by reference herein in its entirety.

FIELD OF THE INVENTION

The present invention relates to the field of data and signal communications, and more particularly, to the use of transmission code violations to facilitate network monitoring and restoration.

BACKGROUND OF THE INVENTION

The reader is presumed to be familiar with commonly used communications network terminology and protocols. For general background information, the reader is referred to Roger L. Freeman, *Practical Data Communications*, John Wiley & Sons, New York, 1995, and the applicable networking standards published by standards bodies such as the Institute of Electrical and Electronic Engineers (IEEE) and the International Standards Organization (ISO), and the Bellcore (now Telcordia) SONET Generic Requirement documents (GRs).

Modem data communication networks often include multiple links or data paths between two or more network elements depending on the network topology. These links are typically monitored for failure and performance degradation by a network management system using a network management protocol. The network management system monitors the network for failure or signal degradation and initiates restoration of the network by, for example, selecting a different physical link to carry the signal.

Depending on the transmission format, the performance of links in a network may be determined by: 1) the transmission signal power received at the monitoring network element, 2) the ability of the monitoring network element to recover bit or frame synchronization with the data stream, or 3) receipt of specific expected data patterns. For network elements using data patterns to monitor performance, the data patterns may be defined in an overall time division multiplexing (TDM) framing format such as Synchronous Optical Network (SONET), or as "hello" or, "handshake" packets typically employed by packet-based data communications networks.

For networks using transmission codes (e.g., block codes), the rate that transmission code violations are received is another indication of the performance of a link. Transmission codes are typically used in communication systems to provide error detection and correction capability through the addition of systematic redundancy at the transmit end of a link such that errors caused by the transmission medium can be corrected at the receiver by means of a decoding algorithm. The amount of redundancy is typically dependent on the type of code selected and the level of error correction capability desired. Although many modem networks use transmission code violations to provide error detection and correction, these conventional systems do not use transmission code violations to trigger network restoration and protection.

Accordingly, there is a need for a system and method of monitoring a network for transmission code violations, and to trigger network restoration and protection based on the number of transmission code violations. It is desired that such a system and method have low overhead and low cost so that it may be easily integrated into existing communications systems and network topologies.

SUMMARY OF THE INVENTION

A method of monitoring and restoring a communications network comprises the steps of: receiving a data stream encoded with a transmission code; decoding the data stream to determine a performance metric based on a number of transmission code violations; and restoring the performance of the communications network in response to the performance metric.

In a preferred embodiment of the present invention, the performance metric is an error rate determined from the number of transmission code violations, and the performance of the network is restored by transferring traffic from a first link to a second link in response to the performance metric exceeding a predetermined value.

A system for monitoring and restoring a communications network comprises a first network element and a second network element. The first network element generally includes a transmitter and a switch. The transmitter generally includes an encoder coupled to receive a data stream. The encoder encodes the data stream with a transmission code (e.g., 8B/10B code). The switch is coupled to receive the encoded data stream from the transmitter and a switch signal from the second network element for switching the encoded data stream from a first link to a second link.

The second network element is coupled to the first network element via a plurality of links and generally includes a receiver having a decoder coupled to receive the encoded data stream from the first network element. The decoder decodes the encoded data stream and determines a number of transmission code violations. A monitoring module coupled to the decoder receives the number of transmission code violations and determines a performance metric based on the number of transmission code violations. The monitor module generates a switch signal if the performance metric exceeds a predetermined value. The switch signal is coupled to a switch in the first element for commanding the transfer of the encoded data stream from a first link to a second link. Any number and combination of links and switches can be used with the present invention.

The present invention provides a low overheard, low cost system and method for providing network performance monitoring and restoration by taking advantage of the intrinsic structure of some common transmission codes (e.g., 8B/10B). For example, the present invention does not require the processing of an entire block of data to determine the health of a link. Rather, the present invention need only process a limited number of bits (depending upon the transmission code used) to determine the health of the link.

These and other features, aspects, and advantages of the present invention will become better understood with regard to the following description, appended claims, and accompanying drawings.

DESCRIPTION OF THE PREFERRED EMBODIMENTS

Although the following description of the present invention refers to 8B/10B data streams used in IEEE802.3z Gigabit Ethernet transmissions, other networking standards or protocols are equally applicable, including, without limitation 4B/5B transmission codes used in 100 Mb/s Ethernet and FDDI, and other modulation schemes which use extra code points (e.g., 5×5 QAM).

Figure 1:
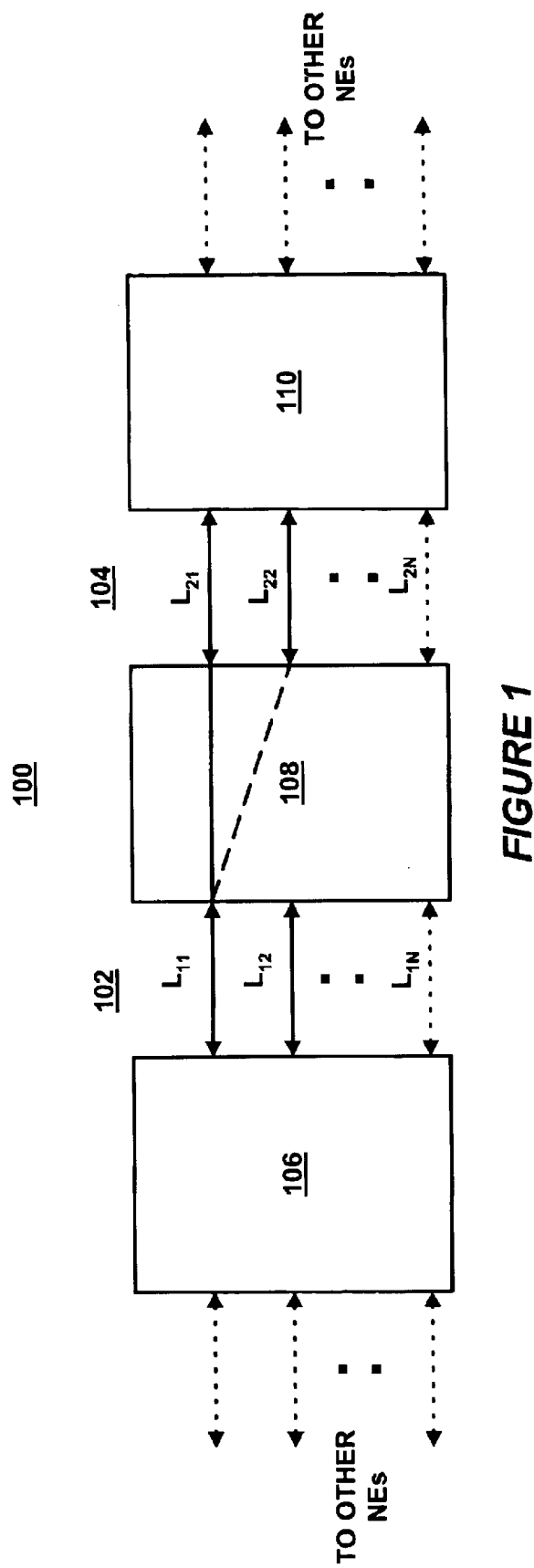
FIG. 1 is a block diagram of a communications network.

Referring to FIG. 1, there is shown a block diagram of a communications network 100. Network 100 includes a plurality of interconnected network elements (NEs) 106, 108 and 110, coupled together by a plurality of data links L11, L12, L1N, L21, L22, L2N, as shown in FIG. 1. FIG. 1 makes clear that network 100 may include any number of NEs interconnected in a variety of topologies, including, but not limited to, token ring, star, mesh, bus and other more complex topologies.

Network 100 includes spans 102 and 104. Span 102 includes NEs 106 and 108 coupled together by full-duplex links L11, L12, L1N and span 104 includes NEs 108 and 110 coupled together by full-duplex links L21, L22, L2N. NEs 106, 108, 110 can be, for example, bridges, routers, switches, hubs or any hybrids of such devices. In a preferred embodiment of the present invention, a data stream entering NE 108 on link L11 in span 102 is switched or otherwise routed by NE 108 from a working link L21 in span 104 to a protection link L22 in span 104 in response to a switch signal generated by NE 110, which indicates failure or degraded performance in working link L21. The switch signal is generated in response to a performance metric based on a number transmission code violations detected by NE 110, as described further with respect to FIG. 4.

Many standard communication protocols use transmission codes, such as the 8B/10B transmission code described in A. X. Widmer and P. A. Franaszek, "A DC-Balanced, Partitioned-Block, 8B/10B Transmission Code," IBM Journal of Research and Development, vol. 27, No. 5, pp. 440–451, September, 1983. The 8B/10B transmission code is a well-known forward error correction code (FEC) having two redundant bits (e.g., parity bits) for providing systematic redundancy during encoding such that errors caused by the medium or link can be corrected at the receiver by means of a decoding algorithm.

Figure 4:
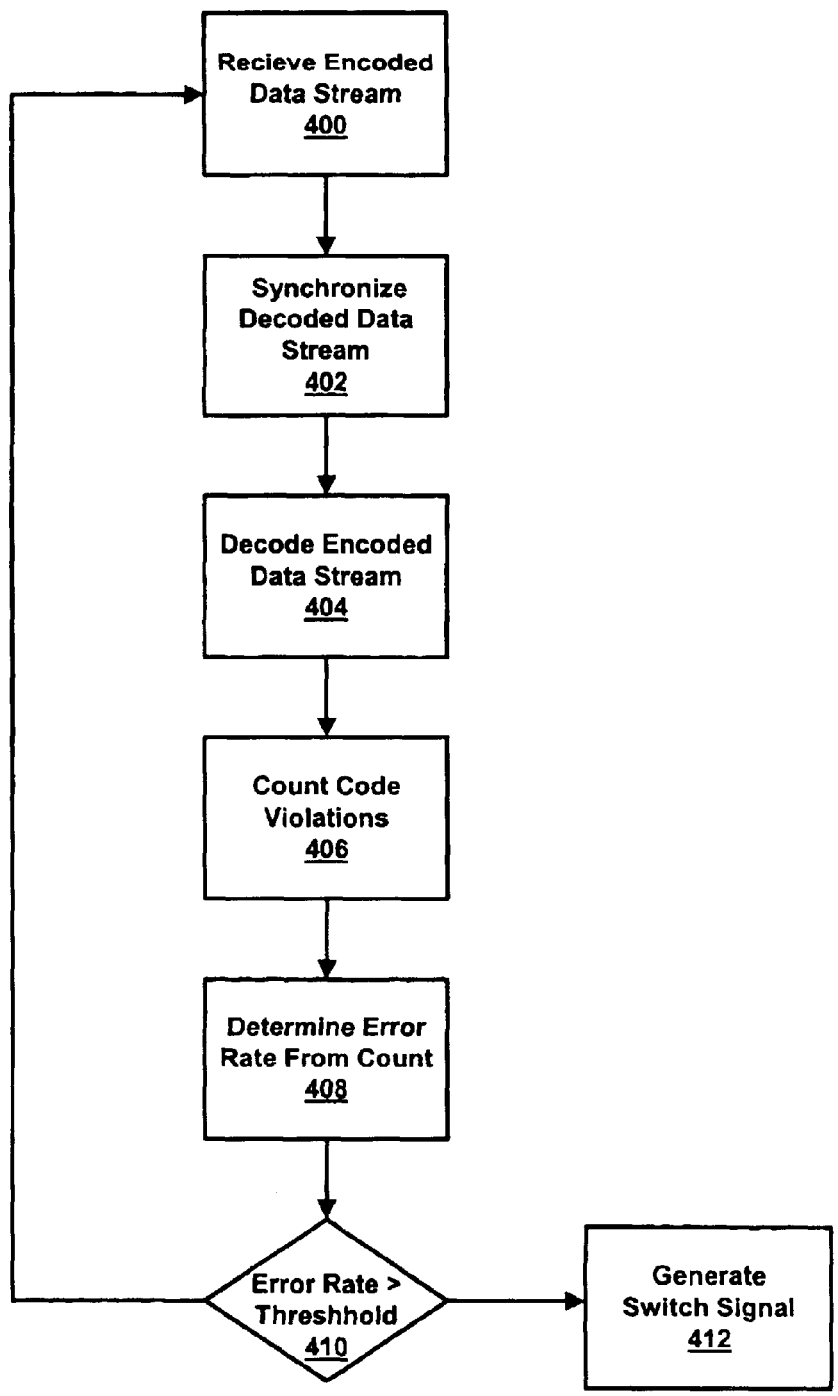
FIG. 4 is a flow diagram of a method of monitoring and restoring the performance of the point-to-point span in FIG. 2.

In a preferred embodiment of the present invention, the error detection capability of the 8B/10B transmission code is used to initiate switching between two or more NEs, as described with respect to FIG. 4. Although the description that follows refers to 8B/10B codes, other codes are equally applicable to the present invention, including but not limited to, 4B/5B code used in 100 Mb/s Ethernet and FDDI or any other modulation schemes that use extra code points (e.g., 5×5 QAM).

Figure 2:
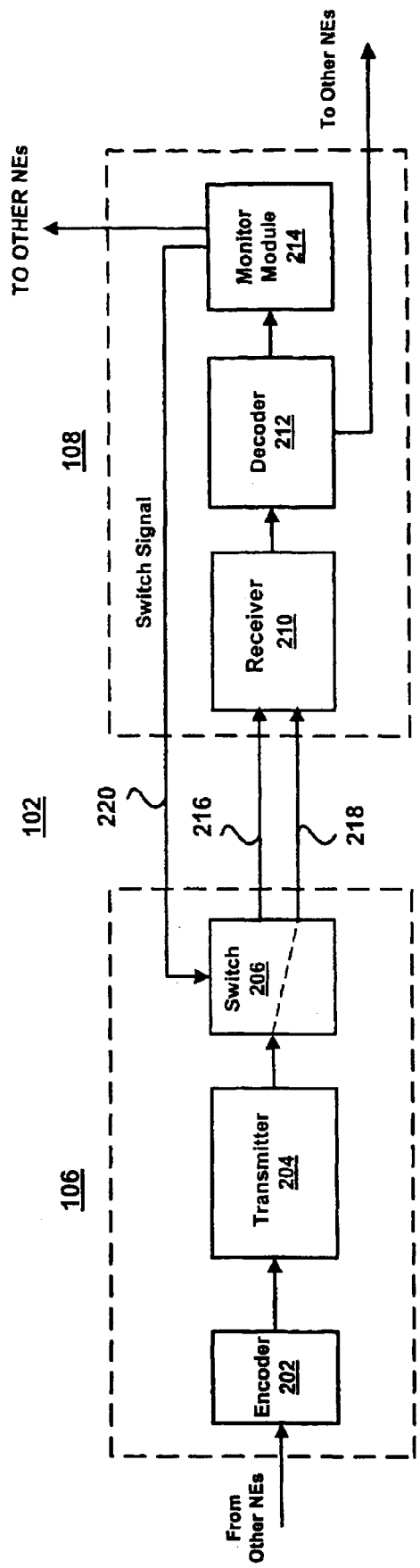
FIG. 2 is a block diagram of a point-to-point span of the communications network shown in FIG. 1.
Figure 3:
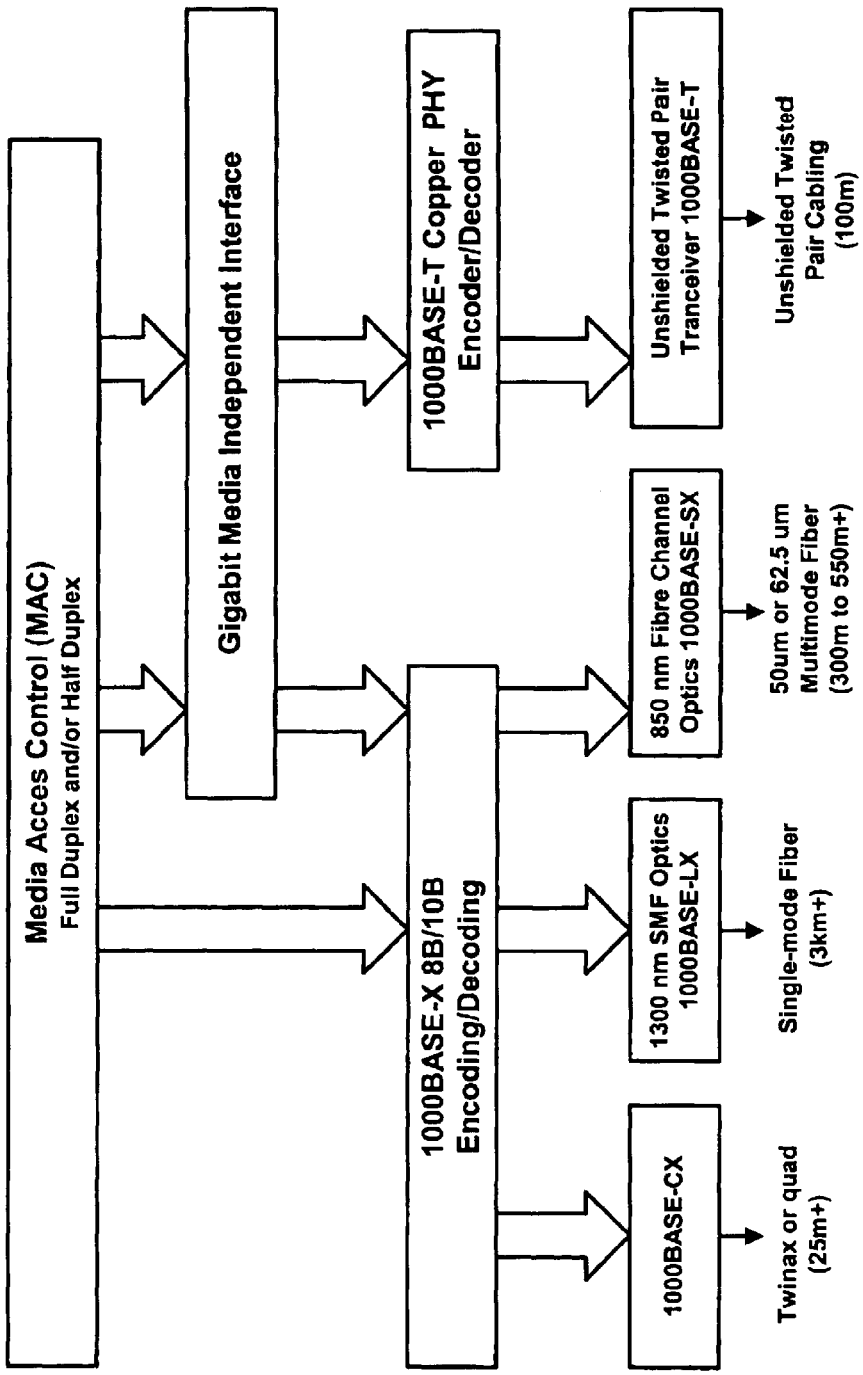
FIG. 3 is a block diagram illustrating the functional elements of Gigabit Ethernet technology.

Referring to FIG. 2, there is shown a block diagram of a point-to-point span 102 of the communications network 100 shown in FIG. 1. In a preferred embodiment of the invention, span 102 is a Gigabit Ethernet (hereinafter also referred to as "GE"). GE technology is a 1-Gbit/sec (1,000-Mbit/sec) extension of the IEEE 802.3 Ethernet networking standard designed for applications needing a high-bandwidth backbone. It supports full-duplex operation for switch-to-switch and switch-to-end connections and supports half-duplex operation on shared network connections that use repeaters and the CSMA/CD medium access method. FIG. 3 illustrates the functional elements of GE technology. Of particular importance to the present invention is the functional element relating to 8B/10B encoding and decoding. The 8B/10B coding function is part of the GE standard and is well understood by those skilled in the art. For further information regarding GE technology, the reader is invited to review the IEEE 802.3z specification, which describes the GE technology.

In FIG. 2, span 102 includes NE 106 and NE 108. NE 106 preferably includes an encoder 202, a transmitter 204, and a switch 206. NE 108 preferably includes a receiver 210, a decoder 212 and a monitor module 214. NEs 106 and 108 are coupled together by working link 216 and protection link 218. The monitor module 214 in NE 108 and switch 206 in NE 106 are coupled by a return link 220. Return link 220 can be a standby link reserved for traffic switched from a failed working link or links, or alternatively, it may be another working link.

NEs 106 and 108 would typically include both receiver and transmitter functionality (e.g., transceiver) for receiving and transmitting data, respectively, to other NEs in the network 100. For clarity, however, only the transmission functionality is shown for NE 106 and only the receiver functionality is shown for NE 108. In practice, encoder 202 and switch 206 can be integrated with transmitter 204 and decoder 212 and monitor module 214 can be integrated with receiver 210. Also, it is noted that the present invention can work with any number and combination of links, transmitters, receivers, switches and monitor modules depending on the network topology or system requirements.

Referring to NE 106, encoder 202 is coupled tone or more NEs for receiving one or more data streams. Encoder 202 preferably encodes the data stream using, for example, an 8B/10B transmission code. The encoding of the data stream can be accomplished using the methods described in U.S. Pat. No. 5,740,186, which is incorporated by reference herein in its entirety. Encoder 202 is coupled to transmitter 204 for formatting and placing the encoded data stream on either working link 216 or protection link 218 via switch 206. Switch 206 is coupled to return link 220 for receiving a switch signal from monitor module 214 located in NE 108. The switch signal is used by switch 206 to switch or otherwise transfer the encoded data stream from working link 216 to protection link 218, as further described with respect to FIG. 4.

Referring to NE 108, receiver 210 receives the encoded data stream from the working link 216 and prepares the encoded data stream for decoding using conventional techniques. In one embodiment, receiver 2J0 is adapted to convert data link voltages to, for example, TTL/MOS compatible, voltages for use with a phase locked loop coupled to a clock for generating a signal synchronized with the data stream. The synchronized signal can be coupled to a logic sequencer not shown) in decoder 212 for recognizing frame or byte boundaries and for implementing a decoding algorithm compatible with the encoding algorithm to detect transmission code violations and provide error correction (see, e.g., U.S. Pat. No. 5,740,186). Once decoder 212 has synchronized and decoded the encoded data stream, the monitor module 214 counts a number of transmission code violations and computes a performance metric for link 216 based on the count. In a preferred embodiment of the present invention, the performance metric is a rate of transmission code violations RE. The error rate RE is computed by dividing the total number of transmission code violations occurring over a predetermined period of time or, alternatively, over a predetermined number of data frames. If the performance metric indicates that the working link 216 has failed or provides unacceptably degraded performance, a switch signal is sent from module 214 to switch 206 via return path 220. Upon receipt of the switch signal from module 214, switch 206 switches or otherwise transfers the data stream to protection link 218. A preferred embodiment of the switch 206 can include a multiplexer (not shown) coupled to a control module (not shown) for controlling the switching of traffic between links 216 and 218 in response to the switch signal using conventional techniques.

Although the embodiment described above could be used in scenarios where the working link 216 has completely failed (e.g., break in the medium), the present invention is equally applicable to scenarios where the working link is subject to degraded performance due to high noise levels or other types of interference, but has not completely failed. In such scenarios, link 218 is a working link used for carrying traffic during normal operation. The data stream carried on link 216 can be multiplexed onto link 218 using a variety of techniques depending upon the application (e.g., time division multiplexing (TDM), frequency division multiplexing (FDM), wavelength division multiplexing (WDM)).

Referring to FIG. 4, there is shown a flow diagram of a method of monitoring and restoring the performance of a communication link in accordance with the present invention. In span 102 forming part of network 100, NE 106 transmits a data stream encoded with a transmission code (e.g., 8B/10B) over working link 216. NE 108 receives 400 the encoded data stream from working link 216. The data stream is synchronized 402 by receiver 210 and decoded 404 by decoder 212 in NE 108 using conventional techniques. Decoder 212 counts 406 a number of transmission code violations using known methods (see, e.g., U.S. Pat. No. 5,704,186). Monitor module 214 in NE 108 determines a performance metric (e.g., error rate $R_E$) from the number of transmission code violations. If 410 the performance metric exceeds a predetermined value, a switch signal is generated 412 by monitor module 214 for commanding switch 206 in NE 106 to switch the encoded data stream from working link 216 to protection link 218.

The preferred embodiment of the present invention described above, provides a low overheard, low cost system and method for providing network performance monitoring and restoration by taking advantage of the intrinsic structure of some common transmission codes (e.g., 8B/10B). For example, the preferred embodiment does not require the processing of an entire block of data to determine the health of a link. Rather, the preferred embodiment need only process a limited number of bits (depending upon the transmission code used) to determine the health of the link.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description but rather by the claims appended hereto.

What is claimed is:

1. A method of monitoring and restoring a communications network, comprising the steps of:

receiving a data stream encoded with a transmission code;

decoding the data stream to determine a performance metric based on a number of transmission code violations; and restoring the performance of the network in response to the performance metric.

2. The method of claim 1, including the step of:

generating an error rate based on the number of transmission code violations for use as the performance metric.

3. The method of claim 2, wherein the step of generating an error rate includes the step of:

dividing a number of transmission code violations by a predetermined period of time.

4. The method of claim 2, wherein the step of generating an error rate includes the step of:

dividing a number of transmission code violations by a predetermined number of data frames.

5. The method of claim 1, including the step of:

generating a switch signal in response to the performance metric exceeding a predetermined value.

6. The method of claim 5, including the step of:

transferring the data stream from a first link to a second link in response to the switch signal.

7. A system for monitoring and restoring a communications network, comprising:

a first network element, comprising:

a transmitter having an encoder coupled to receive a data stream, the encoder for encoding the data stream with a transmission code;

a switch coupled to receive the encoded data stream from the transmitter, the switch coupled to a switch signal for switching the encoded data stream from a first link to a second link;

a second network element coupled to the first network element via the first and second links, comprising:

a receiver having a decoder coupled to receive the encoded data stream from the first network element, the decoder for decoding the encoded data stream and determining a number of transmission code violations; and a monitoring module coupled to receive the number of transmission code violations from the receiver, the monitor module for determining a performance metric based on the number of transmission code violations, and for providing the switch signal to the switch in the first network element if the performance metric exceeds a predetermined value.

8. The system of claim 7, wherein the performance metric is an error rate determined from the number of transmission code violations.

9. The system of claim 7, wherein the transmission code is an 8B/10B code.

10. The system of claim 7, wherein the transmission code is an 4B/5B code.

11. The system of claim 7, wherein the communications network is a Gigabit Ethernet.

12. The system of claim 7, wherein the switch signal is coupled to a third network element in a second communications network.

13. A system for monitoring and restoring a communications network, comprising:

a first network element, comprising:

means for transmitting a data stream encoded with a transmission code; and means for switching the encoded data stream between at least a first link and a second link based on a switch signal; and a second network element, comprising:
  means for receiving the encoded data stream via the first or the second link;
  means for determining a number of transmission code violations;
  means for determining a performance metric based on the number of transmission code violations; and
  means for providing the switch signal based on the performance metric.

14. The system of claim 13, wherein the means for providing the switch signal provides the switch signal if the performance metric exceeds a predetermined value measured over one or more predetermined measurement standards.

15. The system of claim 14, wherein the predetermined measurement standards include a predetermined period of time and a predetermined number of data frames.

16. The system of claim 13, wherein the performance metric is an error rate of the transmitted encoded data stream.

17. A method of monitoring and restoring performance between a first network element and a second network element, wherein the first and second network elements are coupled to each other via at least a first link and a second link, the method comprising:
  transmitting a data stream from the first network element to the second network element via the first link;
  detecting transmission code violations occurring on the first link;
  determining a performance metric based on the transmission code violations; and
  switching transmission of the data stream from the first network element to the second network element to the second link based on the performance metric.

18. The method of claim 17, wherein the step of switching transmission comprises:
  determining a value of the performance metric over one or more predetermined measurement standards; and
  switching the transmission to the second link if the value of the performance metric exceeds a predetermined value.

19. The method of claim 18, wherein the predetermined measurement standards include a predetermined period of time and a predetermined number of data frames.

20. The method of claim 17, wherein the data stream is encoded with a transmission code.

21. The method of claim 20, wherein the performance metric is an error rate of the transmitted encoded data stream.

* * * * *